United States Patent
Roeck

(10) Patent No.: US 9,763,017 B2
(45) Date of Patent: Sep. 12, 2017

(54) HEARING INSTRUMENT WITH T-COIL

(71) Applicant: SONOVA AG, Stäfa (CH)

(72) Inventor: Hans-Ueli Roeck, Hombrechtkon (CH)

(73) Assignee: Sonova AG, Stäfa (CH)

( * ) Notice: Subject to any disclaimer, the term of this patent is extended or adjusted under 35 U.S.C. 154(b) by 0 days.

(21) Appl. No.: 14/905,518

(22) PCT Filed: Aug. 9, 2013

(86) PCT No.: PCT/EP2013/066742
§ 371 (c)(1),
(2) Date: Jan. 15, 2016

(87) PCT Pub. No.: WO2013/150160
PCT Pub. Date: Oct. 10, 2013

(65) Prior Publication Data
US 2016/0227331 A1    Aug. 4, 2016

(51) Int. Cl.
*H04R 25/00* (2006.01)
*H01Q 1/27* (2006.01)
*H01Q 7/08* (2006.01)
*H04B 1/3827* (2015.01)
*H04W 76/02* (2009.01)

(52) U.S. Cl.
CPC ........... *H04R 25/505* (2013.01); *H01Q 1/273* (2013.01); *H01Q 7/08* (2013.01); *H04B 1/385* (2013.01); *H04R 25/554* (2013.01); *H04W 76/023* (2013.01); *H04R 2225/49* (2013.01); *H04R 2225/51* (2013.01)

(58) Field of Classification Search
USPC ........................ 381/315, 331, 312
See application file for complete search history.

(56) References Cited

U.S. PATENT DOCUMENTS

| | | | |
|---|---|---|---|
| 7,529,378 B2 | 5/2009 | Roeck et al. | |
| 7,978,867 B2 | 7/2011 | Waldron et al. | |
| 8,014,821 B2 | 9/2011 | Drader et al. | |
| 8,340,333 B2 | 12/2012 | Wilson | |
| 2002/0039428 A1* | 4/2002 | Svajda | H04R 25/554 381/331 |
| 2006/0029248 A1 | 2/2006 | Waldron et al. | |

(Continued)

FOREIGN PATENT DOCUMENTS

| | | |
|---|---|---|
| DE | 10 209 018 425 A1 | 7/2010 |
| WO | 02/07479 A1 | 1/2002 |
| WO | 2009/108553 A1 | 9/2009 |

*Primary Examiner* — Sunita Joshi
(74) *Attorney, Agent, or Firm* — Sonova AG

(57) ABSTRACT

A hearing instrument is provided that has a T-coil antenna (14) for picking up an inductively transmitted base-band audio signal, an audio signal processing unit (16) for processing the picked-up T-coil audio signal, an output transducer (18) for stimulation of the user's hearing according to the processed audio signals, and a functional unit (22) that operates in a duty cycling mode and communicates with the audio signal processing unit the respective interference points at which the functional unit is switched from its inactive state to its active state and/or from its active state to its inactive state, wherein the audio signal processing unit applies a click removal treatment to the T-coil audio signal during the respective interference points at the time at which the functional unit is switched to and/or from its active state.

11 Claims, 3 Drawing Sheets

(56) References Cited

U.S. PATENT DOCUMENTS

2009/0186653 A1    7/2009  Drader et al.
2011/0300874 A1   12/2011  Chen
2013/0156239 A1*   6/2013  Pedersen ................ H04R 25/43
                                                        381/315

* cited by examiner

HEARING INSTRUMENT WITH T-COIL

BACKGROUND OF THE INVENTION

Field of the Invention

The invention relates to a hearing instrument comprising a T-coil antenna for picking up a base-band audio signal from a transducer coil of a telephone device and a functional unit operating in a duty cycling mode.

Description of Related Art

Such T-coil antenna of a hearing instrument is a ferrite coil which is sensitive not only to the base band audio signal to be picked up from the telephone device transducer, but is also quite sensitive to all other kinds of magnetic fields as induced by noise sources; such noise sources may be external or internal with regard to the hearing instrument. Examples of such noise sources are all power sinks which are duty cycled and which typically require a source current with an AC component having frequencies from a few dozen to a few thousand Hertz. Typically, such AC content is reduced in hearing instruments by either load balancing or noise shaping or large bulk capacitors.

Hearing instruments may be provided with radio frequency (RF) transceiver units for wireless communication purposes. Such RF transceivers, which typically operate around 2.4 GHz, work in a duty cycled mode as they transmit and/or receive RF packets only during a limited time. Load balancing and noise shaping approaches can be applied to such RF transceivers only to a very limited extent, since such approaches, due to the significant peak currents drawn by the RF transceiver, would make operation of the transceiver un-economical or even may hamper the functionality of the transceiver.

Thus, peaks of the current drawn by the transceiver may induce a magnetic field which, in turn, may be picked up by the T-coil antenna, resulting in an audible distortion of the audio signal. Although the transceiver typically will not be used for audio signal transmission/reception when the T-coil antenna is active, the transceiver may be used for other purposes than audio signal transmission, such as for remote control purposes, during times when the T-coil antenna is active, albeit with a low duty cycle of, for example, 1%. Thus, even when the T-coil antenna is used without a concurrent RF audio link, the RF transceiver may induce a regular click signal in the audio signal picked up by the T-coil antenna, such as every 100 ms, which may be audible to the hearing instrument user.

U.S. Pat. No. 7,529,378 B2 relates to a hearing instrument which is adapted to suppress interfering signals, such as GSM signals, by detecting the repetition rate or frequency of the interfering signal by analyzing the audio signal picked up by the hearing instrument microphone and by attenuating the audio signal at the expected next point in time of occurrence of the interfering signal.

International Patent Application Publication WO 2009/108553 A1 and corresponding U.S. Pat. No. 7,529,378 B2 relates to a hearing instrument which is adapted to suppress interfering U.S. Pat. No. 8,340,333 relate to a hearing instrument comprising a T-coil, wherein the input audio signal is analyzed in order to create a waveform of a noise signal in the input audio signal, and wherein the waveform of the noise signal is subtracted from the input audio signal in order to remove noise from the audio signal.

U.S. Patent Application Publication 2011/0300874 A1 relates to a method for removing TDMA noise from an audio signal, wherein the TDMA noise filter only is activated during non-speech intervals of the audio signal.

German Patent Application DE 10 2009 018 425 A1 relates to a hearing instrument comprising a T-coil and a transmission coil for wireless communication above the frequency range of the telephone signal, wherein the audio signal picked up by the T-coil is analyzed in order to remove noise resulting from the transmission coil by subtracting a model noise signal or by adding an anti-noise signal.

SUMMARY OF THE INVENTION

It is an object of the invention to provide for a hearing instrument including a T-coil antenna and a functional unit operating in a duty cycling mode, such as a RF transmission unit, wherein noise in the signal picked up by the T-coil antenna is to be reduced in an efficient manner.

It is a further object to provide for a corresponding hearing assistance method.

According to the invention, these objects are achieved by a hearing instrument as described herein.

The invention is beneficial, in that, by communicating from the functional unit to the audio signal processing unit the interference points in time at which the functional unit is switched from its inactive state to its active state or vice versa and by applying a click removal treatment to the T-coil audio signal during such interference points in time, noise resulting from the duty cycling operation of the functional unit can be removed from the T-coil audio signal in a simple and efficient manner.

Preferably, the functional unit is a radio transmission unit.

Hereinafter, examples of the invention will be described with reference to the accompanying drawings.

DETAILED DESCRIPTION OF THE INVENTION

Figure 1:
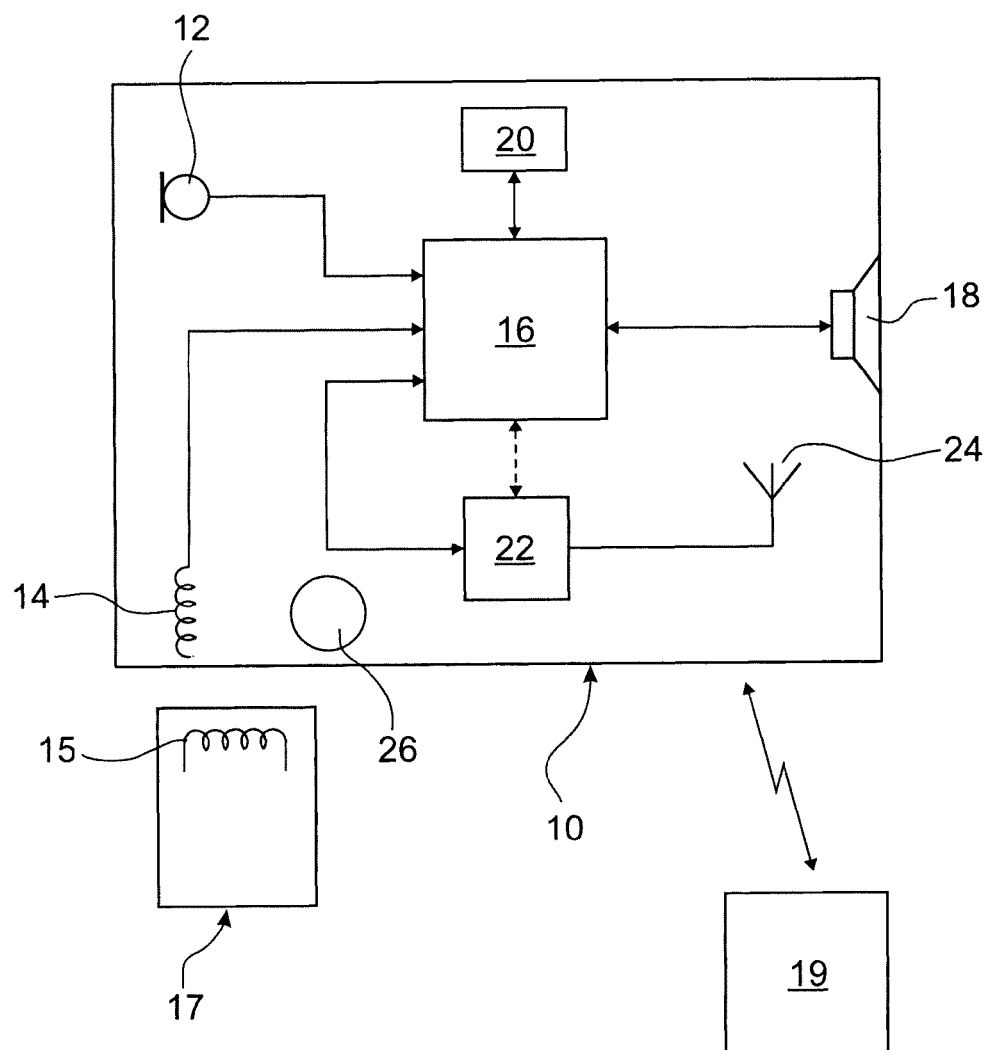
FIG. 1 is a block diagram of an example of a hearing instrument according to the invention.

In FIG. 1, a schematic block diagram of an example of a hearing instrument 10 according to the invention is shown, wherein the hearing instrument 10 comprises a microphone arrangement 12 for capturing audio signals from ambient sound (typically, the microphone arrangement 12 comprises at least two spaced apart microphones for enabling acoustic beamforming), a T-coil antenna 14 for picking up a baseband audio signal from the transducer coil 15 of a telephone device 17, such as a mobile phone or a DECT phone, an audio signal processing unit 16 for processing the audio signals captured by the microphone arrangement 12 and the audio signal picked up by the T-coil 14, and an output transducer for stimulation of the user's hearing according to the processed audio signals, such as a loudspeaker 18 (however, the invention in general is not only applicable to electroacoustic hearing instruments but also to other types, such as bone conduction or electrically stimulating hearing instruments such as cochlear implants). Typically, the hearing instrument 10 also includes a data/program memory 20 communicating with the audio signal processing unit 16.

The hearing instrument 10 further includes a functional unit adapted to operate in a duty cycling mode; typically, such a functional unit is a radio transceiver unit 22 including an antenna 24 for establishing a wireless radio frequency link to an external device 19; examples of such external devices are other hearing instruments (in particular, for implementing a binaural system), wireless microphones, external audio sources, such as a TV set or other audio streamers, etc. For example, such RF unit may operate around 2.4 GHz in the ISM band and may be implemented as a Bluetooth interface or other wireless interface.

The hearing instrument 10 also includes a power source. i.e., battery, 26 for powering the electrical components of the hearing instrument 10.

The duty cycled operation of the RF unit 22 results in current peaks drawn by the RF unit 22 from the battery 26 which, in turn, will induce a magnetic field which is picked up by the T-coil antenna 14 and, since typical frequencies of such induced magnetic field are in the audible range, will result in audible distortion of the audio signal picked up by the T-coil 14. Typically, such distortion signals are perceived as regular "clicks" which are audible, for example, every 100 ms.

In order to reduce or eliminate such audible distortions in the audio signal picked up by the T-coil 14, the RF unit 22 communicates to the audio signal processing unit 16 the interface points in time at which the RF unit 22 is switched from its inactive state to its active state (or vice versa), i.e., the points in time at which the generation of interfering magnetic fields is to be expected, with the audio signal processing unit 16 being adapted to apply a click removal treatment to the T-coil audio signal during such interference points in time.

Figure 2:
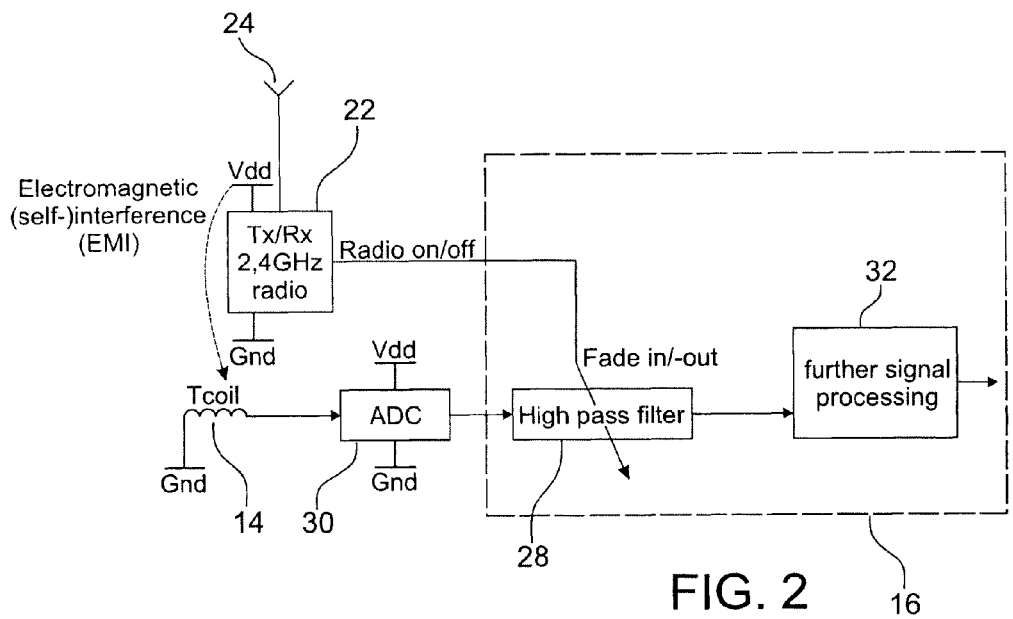
FIG. 2 is a block diagram of an example of the click removal functionality in a hearing instrument according to the invention.

In FIG. 2, a first example of such click removal treatment is shown, wherein a static filter 28 is applied to the T-coil audio signal during the interference points in time, i.e., the operation of the filter 28 is controlled by an interference trigger signal supplied by the RF unit 22 in order to indicate the interference points in time. Preferably, the filter 28 is applied via a fade-in/fade-out procedure. Typically, the filter 28 is a high pass filter. In the example of FIG. 2, the filter 28 is applied in the digital domain, i.e., the audio signal picked up by the T-coil 14 is digitized by a A/D-converter 30 prior to being supplied to the filter 28.

The filtered audio signal leaving the filter 28 undergoes further signal processing, as indicated by a unit 32 in FIG. 2.

Figure 3:
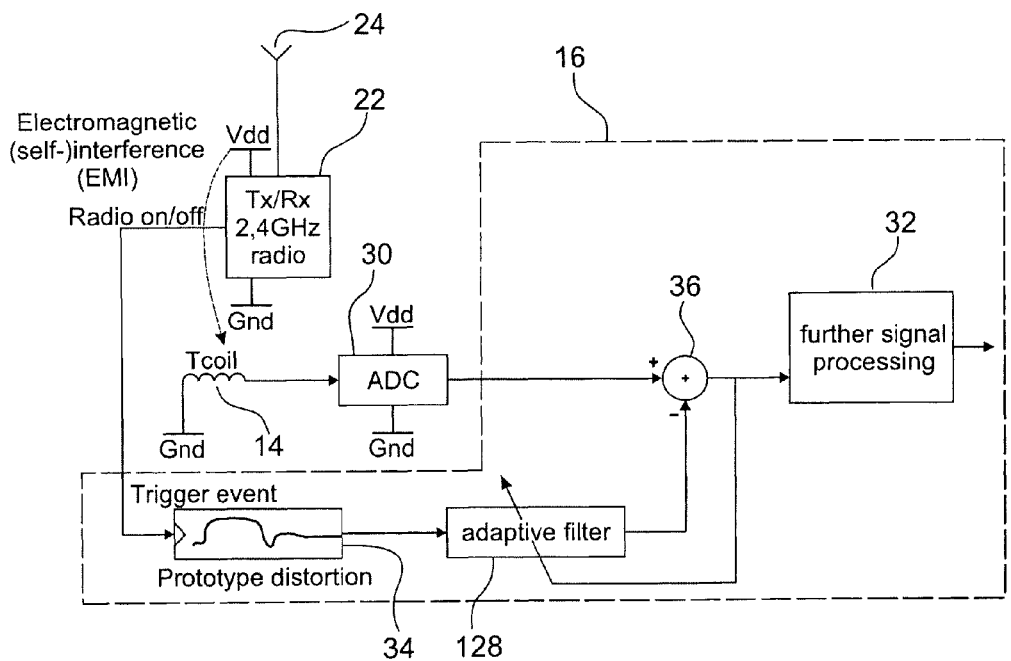
FIG. 3 is a block diagram of an alternative example of the click removal functionality in a hearing instrument according to the invention.

According to a more sophisticated approach shown in FIG. 3, the audio signal processing unit 16 may comprise an adaptive noise cancelling filter 128 that acts as a phase canceller which is adapted to subtract a prototype distortion signal 34 (indicated schematically in FIG. 3) from the T-coil audio signal by means of an adder 36 during the interference points in time. The filter 128 preferably is adapted to adaptively match the prototype distortion signal to a real distortion signal generated in the T-coil audio signal as a result of the duty cycled operation of the unit 22. To this end, a NLMS algorithm or similar algorithm may be used.

According to one example, the prototype distortion signal 34 may be synthesized, i.e., it may be mathematically derived according to a model. While such implementation may not be particularly accurate, it is simple in that it does not require additional signal measurement equipment like an A/D converter. Alternatively, the prototype distortion signal may correspond to a previously in the lab measured real distortion signal generated in the T-coil audio signal which may be stored in the memory 20.

In the embodiment of FIG. 3, the interference trigger signal from the unit 22 serves to synchronize the prototype distortion signal 34 to the actual audio signal picked up by the T-coil 14, i.e., the trigger signal controls the times at which the adapted prototype distortion signal 34 is subtracted from the T-coil audio signal.

Figure 4:
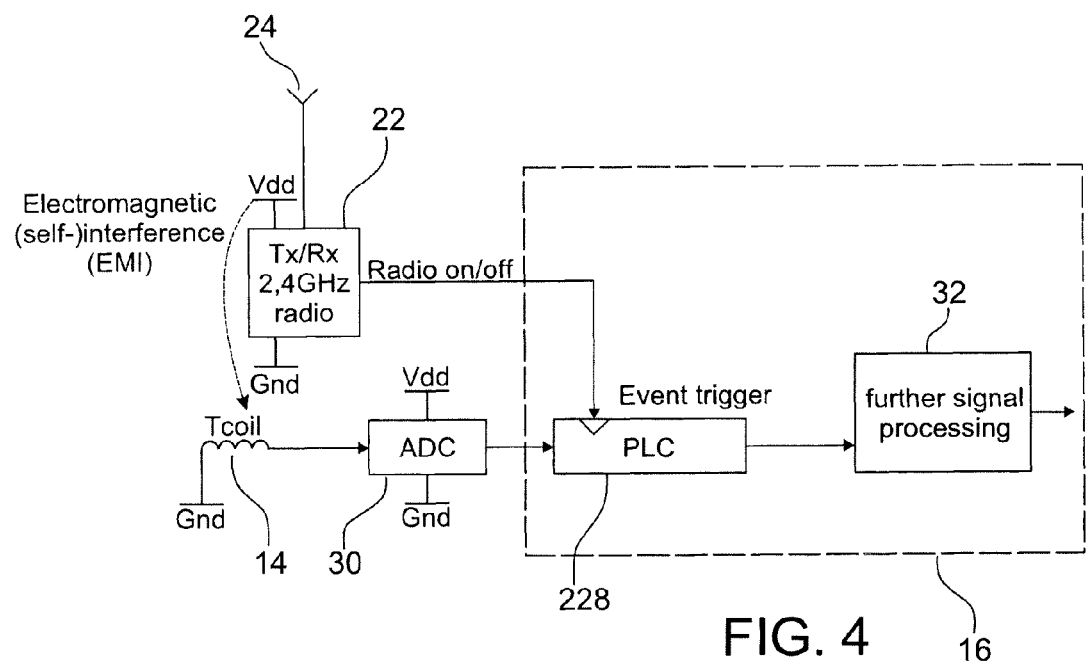
FIG. 4 is a further alternative example of the click removal functionality in a hearing instrument according to the invention.
Figure 5:
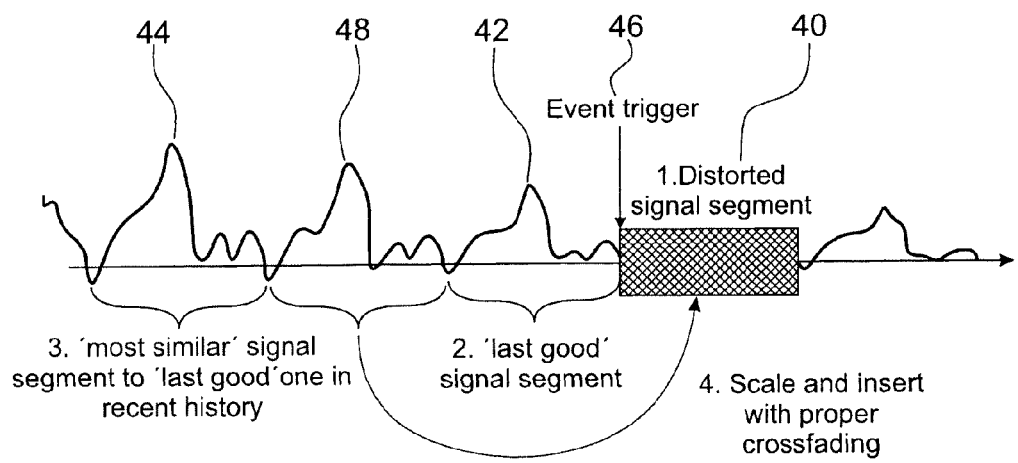
FIG. 5 is a schematic illustration of an example of a packet loss concealment procedure to be used with the invention.

According to a further alternative embodiment as illustrated in FIGS. 4 and 5, the audio signal processing unit 16 comprises a packet loss concealment (PLC) unit 228 for replacing an interference-distorted signal segment of the T-coil audio signal during the interference points in time with a replacement signal segment. In this case, the trigger signal provided by the unit 22 serves to control the PLC unit 228 in such a manner that the signal segment replacement process is synchronized to the actual T-coil audio signal, i.e., to the timing of the interference events. Preferably, the PLC unit 228 is adapted to carry out the signal segment replacement via a fade-in/fade-out procedure.

According to one example, the replacement signal segment is a recorded former T-coil audio signal segment which may get additionally scaled. For example, such recorded former T-coil audio signal segment may be selected by cross correlation analysis. Alternatively to classical cross correlation to determine the 'most similar' segment, other suitable mathematical measures like a Euclidean distance summed up over all samples of a segment may get used as well.

According to an alternative example, the replacement signal segment may be a synthesized signal segment which may be synthesized from current signal properties, such as signal level, pitch frequency, frequency shape, voiced/unvoiced distinction, and other suitable properties.

The replacement by a recorded signal segment is schematically illustrated in FIG. 5, wherein an example of the T-coil audio signal versus time is shown. In FIG. 5 the distorted T-coil signal segment is indicated at 40, the "last good" signal segment is indicated at 42, and the most recent signal segment which is most similar to the "last good" signal segment 42 is indicated at 44.

It is noted that the distorted signal segment 40 is recognized by the audio signal processing unit 16, not by analysis of the audio signal, but by receipt of the event trigger signal at 46 from the RF unit 22.

The "last good" signal segment 42 immediately preceding the distorted signal segment 40 is compared with the previous signal segments in order to determine and select the "most similar" signal segment 44. The signal segment 48 immediately following the "most similar" signal segment 44 has a relatively high probability of being a good replacement for the distorted signal segment 40. Prior to replacing the distorted signal segment 40 the replacement signal segment 48 may get scaled for an average amplitude, and then it is inserted in place of the distorted signal segment 40 with proper cross fading.

According to a still further embodiment, the audio signal processing unit 16 may be adapted to temporarily reduce the gain applied to the T-coil audio signal during the interference points in time, i.e., the gain reduction is controlled by the trigger signal from the RF unit 22. Preferably, the gain then is reduced via a fade-in/fade-out procedure.

It is to be understood that, in case that the period during which the RF unit 22 is active is known, it is sufficient to send a trigger signal to the audio signal processing unit 16 only for the "on-event" (i.e., for the point in time at which the unit 22 changes from its inactive state to its active state), since the audio signal processing unit 16 then is able to calculate the point in time of the "off-event" from the known duration of the active period.

It is pointed out that the click removal treatment may be applied in the digital domain (as shown in the examples of FIGS. 2 to 4), and it may be also applied before A/D conversion in the analog signal domain.

An example of the duty-cycled unit other than an RF transceiver is a data storage device with regular (write) access of a power hungry FlashROM or EEPROM. Writing takes usually more power than reading such a storage device.

For example, due to regular data logging events the controller may write data into the non volatile memory. The trigger event would thus come from the controller of the hearing instrument and therefore may be communicated to the audio signal processing unit, as in the above-discussed case of an RF transceiver.

The invention claimed is:

1. A hearing instrument comprising:
   a T-coil antenna (14) for picking up an inductively transmitted base-band audio signal,
   an audio signal processing unit (16) for processing the picked-up T-coil audio signal,
   an output transducer (18) for stimulation of the user's hearing according to the processed audio signals,
   a functional unit (22) adapted to operate in a duty cycling mode and to communicate to the audio signal processing unit the respective interference points at which the functional unit is switched from its inactive state to its active state and/or from its active state to its inactive state, and
   a microphone arrangement (12) for capturing audio signals from ambient sound,
   wherein the audio signal processing unit (16) is adapted to process the captured audio signals,
   wherein the audio signal processing unit is adapted to apply a click removal treatment to the T-coil audio signal during said respective interference points at time at which the functional unit is switched to and/or from its active state,
   wherein the functional unit is a radio transceiver unit (22, 24) for establishing a wireless radio frequency link to an external device (19),
   wherein the audio signal processing unit (16) comprises a static filter (28) which is applied to the T-coil audio during said respective signal interference points, and
   wherein the audio signal processing unit (16) is adapted to apply the static filter (28) via a fade-in/fade-out procedure.

2. The hearing instrument of claim 1, wherein the static filter (28) is a high pass filter.

3. A hearing instrument comprising:
   a T-coil antenna (14) for picking up an inductively transmitted base-band audio signal,
   an audio signal processing unit (16) for processing the picked-up T-coil audio signal,
   an output transducer (18) for stimulation of the user's hearing according to the processed audio signals,
   a functional unit (22) adapted to operate in a duty cycling mode and to communicate to the audio signal processing unit the respective interference points at which the functional unit is switched from its inactive state to its active state and/or from its active state to its inactive state, and
   a microphone arrangement (12) for capturing audio signals from ambient sound,
   wherein the audio signal processing unit (16) is adapted to process the captured audio signals,
   wherein the audio signal processing unit is adapted to apply a click removal treatment to the T-coil audio signal during said respective interference points at time at which the functional unit is switched to and/or from its active state,
   wherein the functional unit is a radio transceiver unit (22, 24) for establishing a wireless radio frequency link to an external device (19), and
   wherein the audio signal processing unit (16) comprises an adaptive noise cancelling filter (128) acting as a phase canceller, which is adapted to subtract an adapted prototype distortion signal from the T-coil audio signal during said respective signal interference points.

4. The hearing instrument of claim 3, wherein the adaptive noise cancelling filter (128) is adapted to adapt a synthesized prototype distortion signal.

5. The hearing instrument of claim 3, wherein the adaptive noise cancelling filter (128) is fed with a prototype distortion signal corresponding to a previously measured real distortion signal generated in the T-coil audio signal as a result of the switching of the functional unit (22) to or from its active state.

6. A hearing instrument comprising:
   a T-coil antenna (14) for picking up an inductively transmitted base-band audio signal,
   an audio signal processing unit (16) for processing the picked-up T-coil audio signal,
   an output transducer (18) for stimulation of the user's hearing according to the processed audio signals,
   a functional unit (22) adapted to operate in a duty cycling mode and to communicate to the audio signal processing unit the respective interference points at which the functional unit is switched from its inactive state to its active state and/or from its active state to its inactive state, and
   a microphone arrangement (12) for capturing audio signals from ambient sound,
   wherein the audio signal processing unit (16) is adapted to process the captured audio signals,
   wherein the audio signal processing unit is adapted to apply a click removal treatment to the T-coil audio signal during said respective interference points at time at which the functional unit is switched to and/or from its active state,
   wherein the functional unit is a radio transceiver unit (22, 24) for establishing a wireless radio frequency link to an external device (19),
   wherein the audio signal processing unit (16) comprises a packet loss concealment unit (228) for replacing an interference distorted segment (40) of the T-coil audio signal during said respective interference points with a replacement signal segment (48),
   wherein the audio signal processing unit (16) is adapted to carry out the signal segment replacement via a fade-in/fade-out procedure,
   wherein said replacement signal segment (48) is a recorded former T-coil signal segment, and
   wherein the audio signal processing unit (16) is adapted to select the recorded former T-coil signal segment by cross-correlation analysis or by a summed Euclidean distance.

7. The hearing instrument of claim 6, wherein said replacement signal segment (48) is a synthesized signal segment.

8. The hearing instrument of claim 1, wherein the audio signal processing unit (16) is adapted to temporarily reduce the gain applied to the T-coil audio signal during said signal interference points in time via a fade-in/fade-out procedure.

9. A method of providing hearing assistance to a user via a hearing instrument (10), the method comprising
- picking up a base-band audio signal via a T-coil antenna (14) of the hearing instrument from a transducer coil (15) of a telephone device (17), processing, by an audio signal processing unit (16) of the hearing instrument, the picked-up T-coil audio signal, and stimulating the user's hearing according to the processed audio signals,
- the method further comprising capturing audio signals from ambient sound with a microphone arrangement (12),
- wherein the audio signal processing unit (16) is adapted to process the captured audio signals,
- wherein a functional unit (22) of the hearing instruments operates in a duty cycling mode and communicates to the audio signal processing unit the respective interference points at which the functional unit is switched from its inactive state to its active state and/or from its active state to its inactive state,
- wherein a click removal treatment is applied by the audio signal processing unit to the T-coil audio signal during said respective interference points at the time at which the functional unit is switched to or from its active state,
- wherein the functional unit is a radio transceiver unit (22, 24) for establishing a wireless radio frequency link to an external device (19),
- wherein the audio signal processing unit (16) comprises a static filter (28) which is applied to the T-coil audio during said respective signal interference points, and
- wherein the audio signal processing unit (16) is adapted to apply the static filter (28) via a fade-in/fade-out procedure.

10. A method of providing hearing assistance to a user via a hearing instrument (10), the method comprising:
- picking up a base-band audio signal via a T-coil antenna (14) of the hearing instrument from a transducer coil (15) of a telephone device (17), processing, by an audio signal processing unit (16) of the hearing instrument, the picked-up T-coil audio signal, and stimulating the user's hearing according to the processed audio signals,
- the method further comprising capturing audio signals from ambient sound with a microphone arrangement (12),
- wherein the audio signal processing unit (16) is adapted to process the captured audio signals,
- wherein a functional unit (22) of the hearing instruments operates in a duty cycling mode and communicates to the audio signal processing unit the respective interference points at which the functional unit is switched from its inactive state to its active state and/or from its active state to its inactive state,
- wherein a click removal treatment is applied by the audio signal processing unit to the T-coil audio signal during said respective interference points at the time at which the functional unit is switched to or from its active state,
- wherein the functional unit is a radio transceiver unit (22, 24) for establishing a wireless radio frequency link to an external device (19), and
- wherein the audio signal processing unit (16) comprises an adaptive noise cancelling filter (128) acting as a phase canceller, which is adapted to subtract an adapted prototype distortion signal from the T-coil audio signal during said respective signal interference points.

11. A method of providing hearing assistance to a user via a hearing instrument (10), the method comprising:
- picking up a base-band audio signal via a T-coil antenna (14) of the hearing instrument from a transducer coil (15) of a telephone device (17), processing, by an audio signal processing unit (16) of the hearing instrument, the picked-up T-coil audio signal, and stimulating the user's hearing according to the processed audio signals,
- the method further comprising capturing audio signals from ambient sound with a microphone arrangement (12),
- wherein the audio signal processing unit (16) is adapted to process the captured audio signals,
- wherein a functional unit (22) of the hearing instruments operates in a duty cycling mode and communicates to the audio signal processing unit the respective interference points at which the functional unit is switched from its inactive state to its active state and/or from its active state to its inactive state,
- wherein a click removal treatment is applied by the audio signal processing unit to the T-coil audio signal during said respective interference points at the time at which the functional unit is switched to or from its active state,
- wherein the functional unit is a radio transceiver unit (22, 24) for establishing a wireless radio frequency link to an external device (19),
- wherein the audio signal processing unit (16) comprises a packet loss concealment unit (228) for replacing an interference distorted segment (40) of the T-coil audio signal during said respective interference points with a replacement signal segment (48),
- wherein the audio signal processing unit (16) is adapted to carry out the signal segment replacement via a fade-in/fade-out procedure,
- wherein said replacement signal segment (48) is a recorded former T-coil signal segment, and
- wherein the audio signal processing unit (16) is adapted to select the recorded former T-coil signal segment by cross-correlation analysis or by a summed Euclidean distance.

* * * * *